United States Patent
Owariya

[19]

[11] Patent Number: 6,000,113
[45] Date of Patent: *Dec. 14, 1999

[54] VERTICAL MACHINE TOOL

[75] Inventor: Sakae Owariya, Shizuoka-ken, Japan

[73] Assignee: Toshiba Kikai Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,574

[22] Filed: Jan. 22, 1997

Related U.S. Application Data

[63] Continuation of application No. 08/412,116, Mar. 28, 1995, abandoned.

[30] Foreign Application Priority Data

Mar. 29, 1994 [JP] Japan ................................. 6-082237
Oct. 20, 1994 [JP] Japan ................................. 6-255558

[51] Int. Cl.⁶ ........................... B23Q 1/25; B23C 1/06; B65G 37/00
[52] U.S. Cl. ........................ 29/33 P; 409/164; 409/188; 409/225
[58] Field of Search ...................... 29/33 P, 563, 29/564, 56.5; 409/165, 169, 174, 172, 163, 219, 225, 164, 166; 483/59, 14; 198/346.1

[56] References Cited

U.S. PATENT DOCUMENTS

| | | | |
|---|---|---|---|
| 1,355,809 | 10/1920 | Bryant | 409/165 |
| 2,570,444 | 10/1951 | Henkel | 409/165 X |
| 2,829,566 | 4/1958 | Gecks et al. | 409/219 |
| 3,099,873 | 8/1963 | Brainard et al. | 483/14 X |
| 3,217,406 | 11/1965 | Dever | 483/59 X |
| 3,293,990 | 12/1966 | Deflandre | 409/165 |
| 3,703,847 | 11/1972 | Pillot et al. | 409/165 |
| 3,760,490 | 9/1973 | Burg | 483/59 X |
| 4,512,068 | 4/1985 | Plotrowsky | 29/33 P |
| 4,715,490 | 12/1987 | Daze et al. | 29/33 P X |
| 4,799,835 | 1/1989 | Doi | 409/219 |
| 4,984,351 | 1/1991 | Matsuyama et al. | 29/33 P X |
| 4,999,895 | 3/1991 | Hirose et al. | 29/33 P |
| 5,018,617 | 5/1991 | Miyaza et al. | 198/346.1 |
| 5,220,715 | 6/1993 | Otani et al. | 29/33 P |

*Primary Examiner*—William Briggs
*Attorney, Agent, or Firm*—Finnegan, Henderson, Farabow, Garrett & Dunner, L.L.P.

[57] ABSTRACT

In a vertical machine tool has a main spindle head (13); a main spindle (15) rotatably supported by the main spindle head vertically; and a worktable (7, 9) movable horizontally, a frontmost stroke end position of the worktable (7, 9) relative to the main spindle head (13) is determined in such a way that a rearmost edge portion (7a) of the worktable (7, 9) is dislocated a predetermined set-up stoke Sa away from a central position (C) of the main spindle (15). Therefore, when work is mounted by use of a crane or hoist, it is possible to prevent the hook of the crane from interfering with the main spindle head, thus improving the set-up workability. Further, it is preferable to form a plurality of grooves (25) extending in front and rear direction of the machine tool on an upper surface of the worktable also to improve the set-up workability, without forming a plurality of grooves in the right and left direction of the machine tool.

16 Claims, 3 Drawing Sheets

FRONT ←—Y—→ REAR

VERTICAL MACHINE TOOL

This application is a continuation of application Ser. No. 08/412,116, filed Mar. 28, 1995, now abandoned.

BACKGROUND OF THE INVENTION

1. Technical Field

The present invention relates to a vertical machine tool such as a vertical machining center, a vertical milling machine, etc. in which a main spindle thereof is provided vertically to a main spindle head, and more specifically to a vertical machine tool which can improve the set-up (preparatory) workability.

2. Description of the Related Art

In conventional machine tools such as vertical machining centers, vertical milling machines, etc., a main spindle is rotatably supported by a main spindle head, and the main spindle head is supported by a column so as to be movable in the vertical direction. Further, a worktable is arranged so as to be movable in a horizontal plane relative to the main spindle head. In the case of the vertical machining center of fixed column type, for instance, the main spindle head is supported by a fixed column so as to be movable in a Z-axis (vertical) direction, and the worktable is arranged so as to be movable relative to the main spindle head in both the horizontal X-axis (right and left) and Y-axis (front and rear) directions, when seen from the front of the machine tool.

In the above-mentioned vertical machining center, work on the worktable can be located in position by moving the worktable in both the X- and Y-axis directions, and after that the work on the worktable can be processed by use of a tool attached to the main spindle rotatably supported by the main spindle head.

In the conventional vertical machine tool as described above, the stroke end position of the worktable in both X- and Y-axis directions are determined in such a way that the innermost edge portions of the worktable are located at a position under the main spindle. This is because the work can be processed, even if the worktable is moved at the maximum strokes thereof. Further, this is because it possible to minimize the size of the bed for supporting the worktable movable relative to the main spindle head.

In the conventional vertical machine tool, when work is mounted on the worktable by use of a pendent material handling machine (e.g., crane, hoist, etc.) for set-up (preparatory) work, the worktable is moved to the stroke end position in the Y-axis direction and after that a hook of the material handling machine is lowered. In this case, in the conventional vertical machine tool, since the innermost edge portion of the worktable is determined at the central position of the main spindle, there exists a problem in that the hook of the material handling machine interferes with the main spindle head. Accordingly, at the set-up work, the worker must take care of the collision of the hook with the main spindle head, thus deteriorating the work set-up workability.

Further, in the worktable of the machine tool, a plurality of T-shaped grooves for mounting jigs (T-bolts) or vises are usually formed in the upper surface of the worktable so that work can be fixed to the worktable with the jigs or vises. In the conventional worktable, in general, the T-shaped grooves are mainly formed so as to extend in the X-axis (right and left) direction of the machine tool when seen from the front side thereof. For example, when the worktable is 1600 mm in the X-axis direction and 700 mm in the Y-axis (front and rear) direction, six T-shaped grooves with a width of 18 mm are formed so as to extend in the X-axis direction in parallel to each other, and a single T-shaped groove with the same width is formed so as to extend in the Y-axis direction at roughly the middle position of the worktable.

In the conventional worktable, however, since the six T-shaped grooves extending in the X-axis direction are longer than the single T-shaped groove extending in the Y-axis direction, there exists a problem in that the worker must move over a relatively long distance along the long T-shaped grooves extending in the X-axis direction, whenever jigs or vises are required to be mounted on the worktable, with the result that it takes a long time to mount jigs or vises and clean the T-shaped grooves. In addition, since the Y-axis length of the worktable is usually shorter than the X-axis length thereof, the number of the T-shaped grooves extending in the X-axis direction is inevitably limited to a small numbers so that the vise mounting positions are relatively limited.

SUMMARY OF THE INVENTION

With these problems in mind, therefore, it is the object of the present invention to provide a vertical machine tool which can improve the work set-up workability, when work is mounted onto the worktable by use of a pendent material handling machine and when work is fixed to the worktable by use of jigs or vises.

To achieve the above-mentioned object, the present invention provides a vertical machine tool having a main spindle head (13); a main spindle (15) rotatably supported by the main spindle head vertically; and a worktable (7, 9) movable horizontally, wherein an outermost stroke end position of the worktable (7, 9) relative to the main spindle head (13) is determined in such a way that an innermost edge portion (7a) of the worktable (7, 9) is dislocated a predetermined stroke (Sa) away from a central position (C) of the main spindle (15).

Here, the worktable is dislocated in a front and rear direction or in a right and left direction of the machine tool. The predetermined stroke (Sa) is a set-up stroke of about 100 to 200 mm. Further, it is preferable that whenever the innermost edge portion (7a) of the worktable (7, 9) is moved away from a central position (C) of the main spindle (15), the main spindle is stopped from rotating and further movement speed of the worktable is reduced.

Further, the present invention provides a vertical machine tool having a worktable formed with a plurality of grooves (25) extending in front and rear direction of the machine tool on an upper surface of the worktable. In this case, it is preferable that a groove (24) extending in right and left direction of the machine tool is formed on an upper surface of the worktable so as to intersect the grooves (25) extending in the front and rear direction of the machine tool.

As described above, in the vertical machine tool according to the present invention, when the worktable is shifted frontward, for instance to its frontmost stroke end position, since the rearmost edge portion of the worktable is dislocated by a predetermined set-up stroke (Sa) away from the central position of the main spindle of the main spindle head, the worktable can be moved sufficiently frontward away from the main spindle head, so that it is possible to prevent the hook of the pendent material handling machine from interfering with the main spindle head. As a result, the set-up workability can be improved and the set-up work time can be reduced.

Further, in the vertical machining center provided with the worktable according to the present invention, since the number of the Y-axis (the front and rear) grooves is large as compared with that of the X-axis (the right and left) groove, the jig mounting time can be saved; the jigs can be mounted at more desirable positions on the worktable; the groove cleaning work can be facilitated; and the number of mountable jigs can be increased.

DETAILED DESCRIPTION OF THE EMBODIMENTS

An embodiment of the machine tool according to the present invention will be described hereinbelow.

Figure 1:
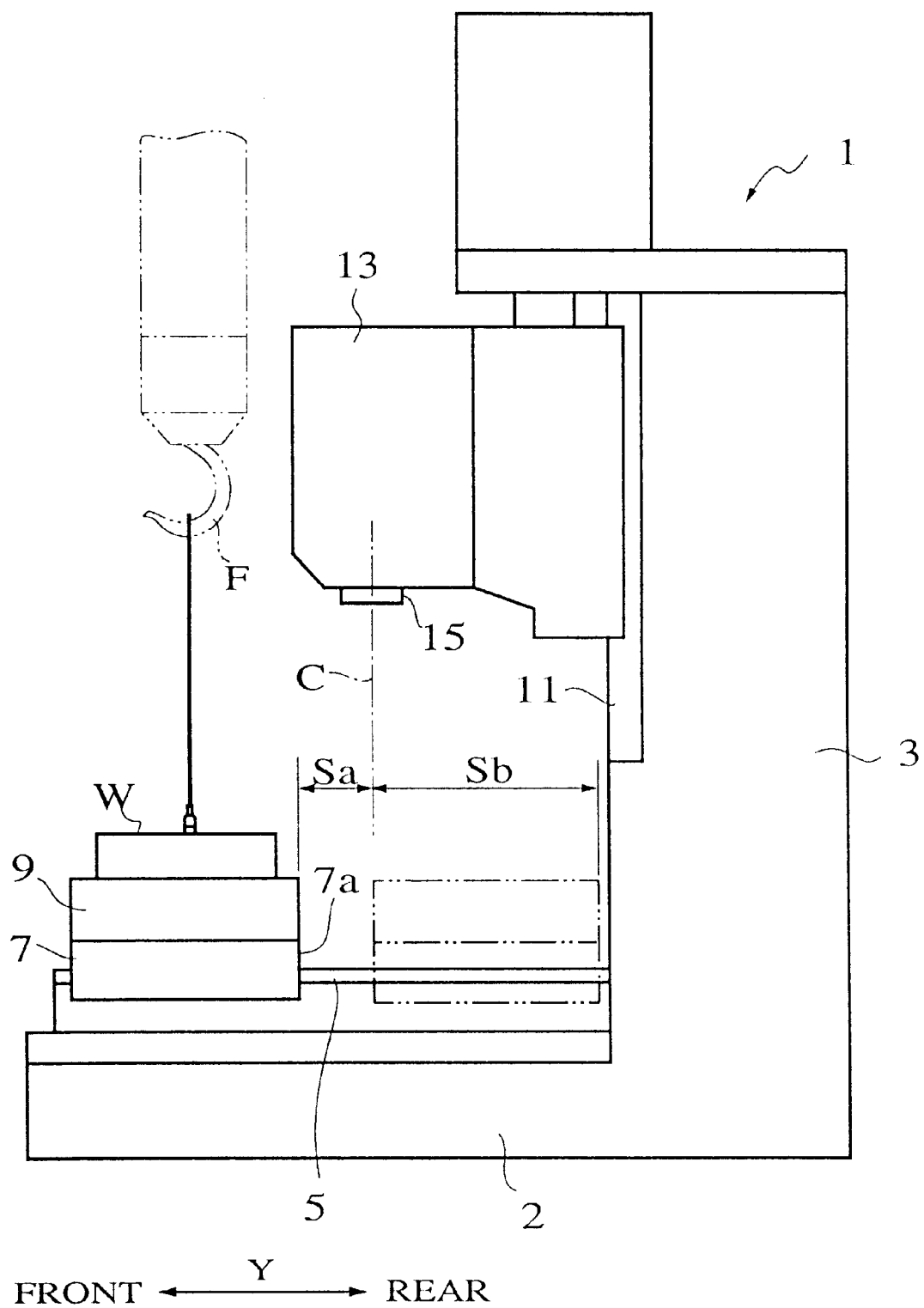
FIG. 1 is a side view showing a vertical machining center, to which the present invention is applied.

A machining center 1 shown in FIG. 1 is provided with a bed 2 formed integral with a fixed column 3. The bed 2 is formed with a table guide portion 5 extending in the Y-axis (the front and rear) direction of the machining center 1. The table guide portion 5 is engaged with a Y-axis table 7, so that the Y-axis table 7 can be moved in the horizontal Y-axis direction. Further, an X-axis table 9 is mounted on the Y-axis table 7, so that the X-axis table 9 can be moved in the horizontal X-axis (the right and left) direction of the machining center 1. Further, work W to be processed is mounted on the X-axis table 9.

On the other hand, a Z-axis head guide portion 11 is formed in the fixed column 3. A main spindle head 13 is engaged with the head guide portion 11, so that the main spindle head 13 can be moved in the vertical Z-axis direction. A main spindle 15 is mounted on the main spindle head 13. Further, tools housed in a tool magazine (not shown) are exchangeably attached to the main spindle 15 by use of a known automatic tool exchange apparatus (not shown).

As shown by solid lines in FIG. 1, the frontward stroke end position of the Y-axis table 7 is determined in such a way that the innermost edge portion 7a of the Y-axis table 7 is dislocated by a predetermined stoke Sa frontward away from a central position C of the main spindle 15 of the main spindle head 13. The offset stroke Sa is about 100 to 200 mm, which is referred to as a set-up stroke.

On the other hand, the stroke Sb between a position at which the innermost edge portion 7a of the Y-axis table 7 matches the central position C of the main spindle 15 and a position at which the innermost edge portion 7a thereof reaches its an innermost end stroke is referred to as a work stroke (a minimum stroke required to process work W mounted on a worktable 9).

Therefore, in the vertical machining center according to the present invention, the length of the Y-axis table guide portion 5 formed in the bed 2 and the overall length of a shaft feed device (not shown) of the Y-axis table 7 are determined by the set-up stroke Sa longer than those of the conventional vertical machining center.

Further, when the Y-axis table 7 is moved within the set-up stroke (Sa) range (away from the spindle central position C), the rotation of the main spindle 15 is stopped by an interlock mechanism for safety and simultaneously the movement speed of the Y-axis table 7 is limited below about 5 m/min, for instance.

Accordingly, in the above-mentioned construction, when the Y-axis table 7 is moved to the frontward stroke end position, the rearmost edge portion 7a thereof is positioned a set-up stroke Sa frontward way from the central position C of the main spindle 15 of the main spindle head 13.

As a result, when work W is mounted onto or dismounted from the X-axis table 9 by use of a pendent material handling machine (crane or hoist) for the set-up work, since the Y-axis worktable 7 can be shifted frontward by the set-up stroke Sa away from the center C of the main spindle 15, the X-axis and Y-axis tables 7 and 9 can be both sufficiently moved frontward away from the main spindle head 13, so that it is possible to perform the set-up work without interference of a hook F of the pendent material handling machine with the main spindle head 13. In other words, it is possible to improve the set-up workability and thereby to shorten the set-up time, whenever a pendent material handling machine is used.

Further, the same effect as described above can be obtained when the rightward or leftward stroke end position of the Y-axis table 7 is determined in such a way that the innermost edge portion 7a of the Y-axis table 7 is dislocated by a predetermined stoke Sa rightward or leftward away from a central position C of the main spindle 15 of the main spindle head 13, according to the situation.

Further, without being limited only to the vertical machining center of fixed column type, the vertical machine tool according to the present invention can be applied to a vertical machining center of movable column type, a vertical milling machine, etc.

Another feature of the machine tool according to the present invention is a worktable structure of the vertical machining center.

Figure 2A:
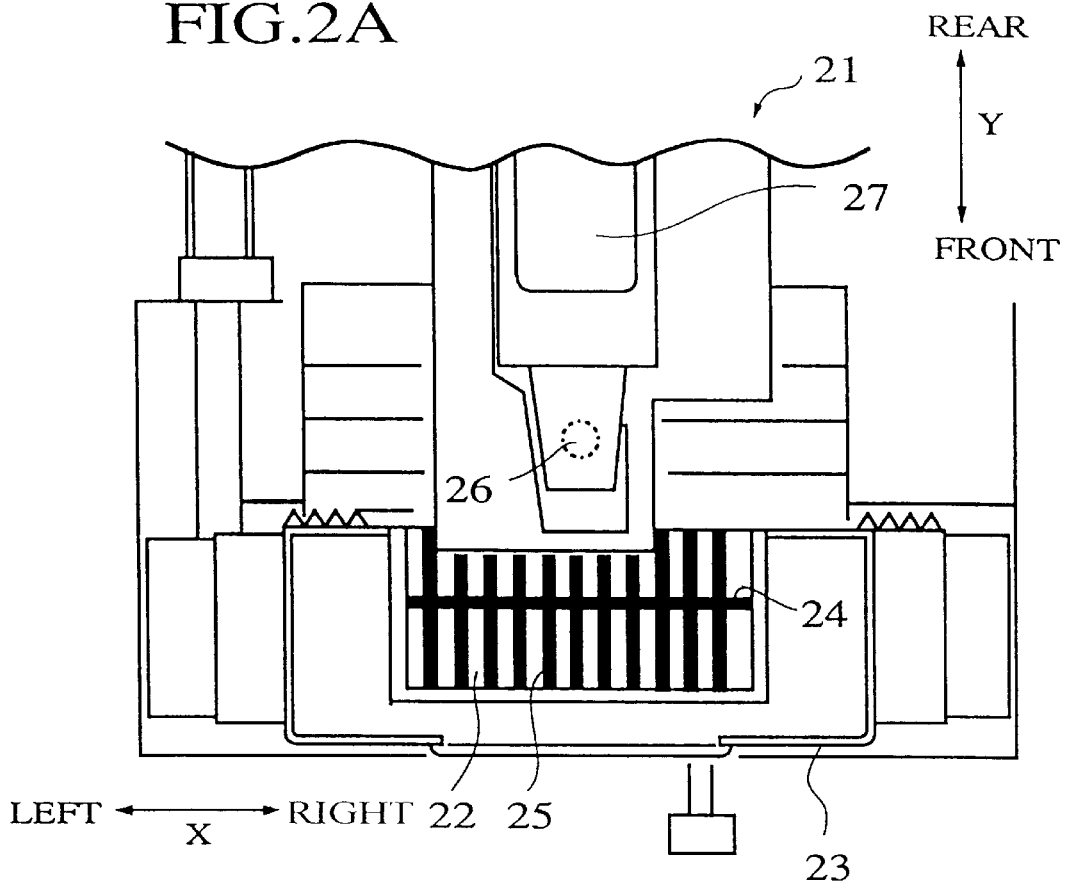
FIG. 2A is a plane view showing a similar vertical machining center shown in FIG. 1.
Figure 2B:
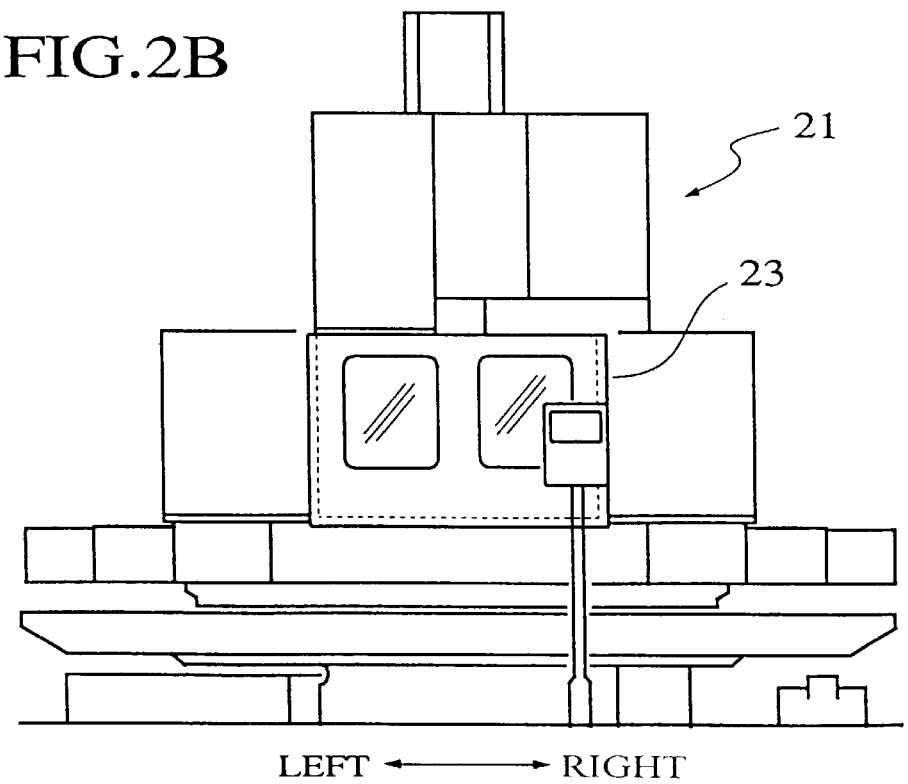
FIG. 2B is a front view showing the same vertical machining center shown in FIG. 2A.

FIG. 2A is a plane view showing the vertical machining center 21 and FIG. 2B is a side view showing the same. In these drawings, a worktable 22 is positioned on the front side of the main spindle 26. On the front and both sides of the worktable 22 are covered with a chip cover 23 for preventing chips from being scattered.

The worktable 22 can be moved both in the X-axis (the right and left) and Y-axis (the front and rear) directions. Further, a tool fixed to the main spindle 26 is moved in the Z-axis (the vertical) direction. Therefore, work mounted on the worktable can be mechanically processed by the tool rotated by the main spindle 26 on the basis of these three-axis directions.

Figure 3:
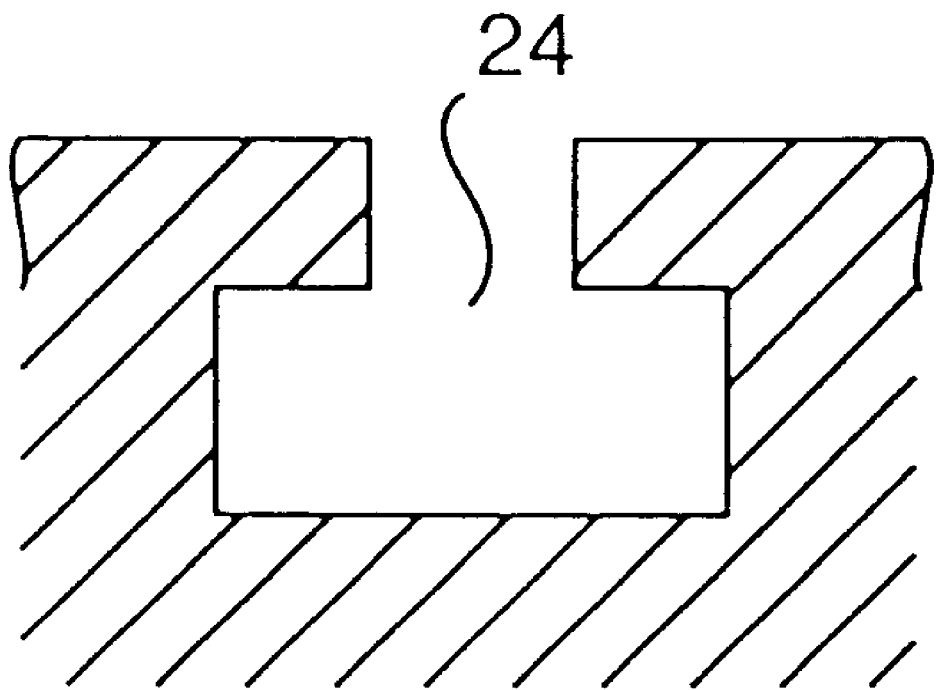
FIG. 3 is a side cross-sectional view of a work table in accordance with the invention, depicting a T-shaped groove.

On the worktable 22, as shown in FIG. 3, a plurality of T-shaped grooves 25 are formed so as to extend in the Y-axis (the front and rear) direction (perpendicular to the fixed column 27). Further, a T-shaped groove 24 is formed so as to extend in the X-axis (the right and left) direction.

When the size of the worktable 22 is 700 mm in the Y-axis direction and 1600 mm in the X-axis direction in the same way as with the case of the conventional worktable, eleven Y-axis T-shaped grooves (a width: 18 mm) 25 and a X-axis T-shape groove (a width: 18 mm) 24 are formed. On the other hand, in the conventional worktable, the Y-axis T-shaped groove is one and the X-axis T-shaped grooves are six.

In the worktable 22 of the vertical machining center 21 as described above, the worker's procedure is as follows:

The chip cover 23 is opened, and then work is mounted on the worktable 22. After that, the chip cover 23 is closed, and the worktable 22 is moved in both the X- and Y-axis direction to process the work by a tool attached to the lower end of the main spindle 26. After the tool processing, the chip cover 23 is opened again, and the chips on the worktable 22 are removed for cleaning.

After that, some jigs (e.g., T-shaped bolts not shown) are fitted to the T-shaped grooves 25 of the worktable 22 to fix work to the worktable 22. In this case, since the movement distance of the T-shaped bolts is reduced from 1600 mm (the X-axis length of the conventional case) to 700 mm (the Y-axis length of the invention case) and further since the worker's movement direction can be changed from the X-axis (the right and left) direction to the Y-axis (the front and rear) direction, the worker's movement distance can be reduced, so that it is possible to shorten the work mounting time roughly half.

Further, since the total lengths of the T-shaped grooves 25 can be shortened, it is possible to reduce the cleaning time by roughly one-third.

In addition, since the total number of the parallel-arranged T-shaped grooves 25 can be increased (from 7 to 12), it is possible to mount the vises (T-shaped bolts) at any more desirable positions on the worktable.

In the above mentioned embodiment, although T-shaped grooves are adopted as grooves, it is possible to adopt grooves having other sectional shapes as grooves. In addition, although jigs (e.g., T-shaped bolt) are adopted as means which fix a work on the worktable, it is possible to adopt other types of jigs as fixing means.

As described above, in the vertical machine tool according to the present invention, when the worktable is shifted frontward, for instance to its frontmost stroke end position, since the rearmost edge portion of the worktable is dislocated by a predetermined set-up stroke Sa away from the central position of the main spindle of the main spindle head, the worktable can be moved sufficiently frontward away from the main spindle head, so that it is possible to prevent the hook of the pendent material handling machine from interfering with the main spindle head. As a result, the set-up workability can be improved and the set-up work time can be reduced.

Further, in the vertical machining center provided with the worktable according to the present invention, since the number of the Y-axis (the front and rear) grooves is large as compared with that of the X-axis (the right and left) groove, the jig mounting time can be saved; the jigs can be mounted at more desirable positions on the worktable; the groove cleaning work can be facilitated; and the number of mountable jigs can be increased.

What is claimed is:

1. A vertical machine tool comprising:

a main spindle head;

a vertical main spindle rotatably supported by the main spindle head; and a horizontal worktable located in a position under the vertical main spindle, the horizontal worktable having front and rear edges and right and left edges and being movable from the position under the vertical main spindle in a right and left horizontal direction and also in a front and rear horizontal direction;

wherein the horizontal worktable is configured to move to an outermost stroke end position relative to the main spindle head such that an innermost edge portion of the worktable is horizontally spaced a predetermined distance away from a central position of the main spindle;

wherein the horizontal worktable includes a first number of grooves defined in an upper surface thereof configured to engage with first means for fixing a work on the worktable, the first number of grooves extending between the front and rear edges of the worktable, and a second number of grooves defined in the upper surface thereof configured to engage with second means for fixing the work on the worktable, the second number of grooves extending between the right and left edges of the worktable, wherein the first number of grooves is greater than the second number of grooves, and wherein a length of each groove in the second number of grooves is over two times a length of each groove in the first number of grooves; and an interlock mechanism for stopping rotation of the main spindle and reducing speed of motion of the worktable when the innermost edge portion of the worktable is moved away from the central position of the main spindle.

2. The vertical machine tool of claim 1, wherein the predetermined distance is about 100 to 200 mm.

3. The vertical machine tool of claim 1, further comprising a wall surrounding the worktable for preventing chips from being scattered.

4. The vertical machine tool of claim 3, wherein the wall includes an opening for transferring the work therethrough, and a door for covering the opening while the tool processes the work.

5. The vertical machine tool of claim 1, wherein the second number of grooves has a T-shaped section.

6. A vertical machine tool comprising:

a main spindle head;

a vertical main spindle rotatably supported by the main spindle head;

a horizontal worktable located in a position under the vertical main spindle, the horizontal worktable being movable away from the position under the vertical main spindle in a horizontal direction wherein an outermost stroke end position of the worktable relative to the main spindle head is positioned such that an innermost edge portion of the worktable is horizontally dislocated a predetermined distance away from a central position of the main spindle; and an interlock mechanism configured to stop rotation of the main spindle and reduce a speed of movement of the worktable when the innermost edge portion of the worktable is moved away from the central position of the main spindle.

7. The vertical machine tool of claim 6, wherein the predetermined distance is about 100 to 200 mm.

8. The vertical machine tool of claim 6, wherein the horizontal worktable has a plurality of grooves defined in a upper surface of the worktable configured to engage with first means for fixing a work on the worktable, the grooves extending along a front and a rear direction of the machine tool, and a second groove defined in the upper surface of the worktable configured to engage with second means for fixing a work on the worktable, the second groove extending along a right and a left direction of the machine tool and intersecting the plurality of grooves extending in the front and rear direction of the machine tool.

9. The vertical machine tool of claim 8, wherein the second groove has a T-shaped section.

10. The vertical machine tool of claim 6, further comprising a wall surrounding the worktable for preventing chips from being scattered.

11. The vertical machine tool of claim 10, wherein the wall includes an opening for transferring the work therethrough and a door for covering the opening while the tool processes the work.

12. The vertical machine tool of claim 1, wherein only a single groove extends between the left and right edges.

13. The vertical machine tool of claim 1, wherein the grooves extending between the right and left edges and the grooves extending between the front and rear edges include a T-shaped section for mounting a work.

14. The vertical machine tool of claim 1, wherein the first number of grooves are substantially parallel.

15. The vertical machine tool of claim 1, wherein the first number of grooves are substantially parallel and both the first number of grooves and the second number of grooves have a T-shaped cross-section.

16. A vertical machine tool comprising:

a main spindle head;

a vertical main spindle rotatably supported by the main spindle head; and a horizontal worktable located in a position under the vertical main spindle, the horizontal worktable being movable away from the position under the vertical main spindle in a horizontal direction, and being configured to move to an outermost stroke end position relative to the main spindle head such that an innermost edge portion of the worktable is horizontally spaced a predetermined distance away from a central position of the main spindle; and an interlock mechanism for stopping rotation of the main spindle and reducing speed of motion of the worktable when the innermost edge portion of the worktable is moved away from the central position of the main spindle;

wherein the horizontal worktable includes a plurality of grooves defined in an upper surface thereof, configured to engage with first means for fixing a work on the worktable, the grooves extending along a front and a rear direction of the machine tool.

* * * * *